(12) United States Patent
Deuerlein et al.

(10) Patent No.: US 10,695,750 B2
(45) Date of Patent: *Jun. 30, 2020

(54) CATALYST FOR DECOMPOSITION OF NITROUS OXIDE

(71) Applicant: BASF SE, Ludwigshafen am Rhein (DE)

(72) Inventors: Stephan Deuerlein, Neuhofen (DE); Regine Helga Bebensee, Ludwigshafen (DE); Harald Würz, Edenkoben (DE); Denis Stella, Schifferstadt (DE); Andreas Spiegel, Ludwigshafen am Rhein (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,659

(22) Filed: Jan. 3, 2019

(65) Prior Publication Data

US 2019/0134611 A1 May 9, 2019

Related U.S. Application Data

(63) Continuation of application No. 15/535,270, filed as application No. PCT/EP2015/077524 on Nov. 24, 2015, now Pat. No. 10,286,381.

(30) Foreign Application Priority Data

Dec. 3, 2014 (EP) ..................................... 14196025

(51) Int. Cl.
*B01J 23/46* (2006.01)
*B01J 37/08* (2006.01)
*B01J 21/06* (2006.01)
*B01J 23/28* (2006.01)
*B01J 35/00* (2006.01)
*B01J 35/02* (2006.01)
*B01J 37/02* (2006.01)
*B01J 37/04* (2006.01)
*B01J 21/08* (2006.01)
*B01J 23/652* (2006.01)
*B01D 53/86* (2006.01)
*B01J 37/00* (2006.01)
*B01J 35/10* (2006.01)

(52) U.S. Cl.
CPC ........ *B01J 23/464* (2013.01); *B01D 53/8628* (2013.01); *B01J 21/066* (2013.01); *B01J 21/08* (2013.01); *B01J 23/28* (2013.01); *B01J 23/6525* (2013.01); *B01J 35/002* (2013.01); *B01J 35/0006* (2013.01); *B01J 35/023* (2013.01); *B01J 35/026* (2013.01); *B01J 35/109* (2013.01); *B01J 35/1014* (2013.01); *B01J 35/1019* (2013.01); *B01J 35/1061* (2013.01); *B01J 35/1066* (2013.01); *B01J 37/0009* (2013.01); *B01J 37/0018* (2013.01); *B01J 37/0201* (2013.01); *B01J 37/0236* (2013.01); *B01J 37/04* (2013.01); *B01J 37/086* (2013.01); *B01J 37/088* (2013.01); *B01D 2255/1025* (2013.01); *B01D 2255/20715* (2013.01); *B01D 2255/20769* (2013.01); *B01D 2255/30* (2013.01); *B01D 2257/402* (2013.01); *Y02C 20/10* (2013.01)

(58) Field of Classification Search
CPC ...... B01J 21/066; B01J 37/088; B01J 23/464; B01J 23/6525; B01J 35/1014; B01J 35/1019; B01J 35/1061; B01J 35/1066; B01J 35/109; B01J 37/0009; B01J 37/0018; B01J 37/0201; B01J 37/0236; B01J 35/026; B01J 35/0006; B01J 23/28; B01J 37/086; B01J 37/04; B01J 21/08; B01D 53/8628; B01D 2255/1025; B01D 2255/207; B01D 2255/20769; B01D 2255/30; B01D 2257/402; Y02C 20/10
See application file for complete search history.

(56) References Cited

U.S. PATENT DOCUMENTS

| 3,120,483 | A | 2/1964 | Dean et al. | |
| 6,710,010 | B2 * | 3/2004 | VerNooy | B01D 53/8628 502/349 |
| 6,890,499 | B2 | 5/2005 | Schwefer | |
| 7,157,406 | B2 | 1/2007 | Irgang et al. | |
| 7,259,121 | B2 | 8/2007 | Schwefer et al. | |
| 7,393,512 | B2 | 7/2008 | Schwefer et al. | |
| 7,462,340 | B2 | 12/2008 | Schwefer et al. | |
| 7,744,839 | B2 | 6/2010 | Schwefer et al. | |
| 7,850,842 | B2 * | 12/2010 | Hofstadt | B01J 21/066 208/137 |
| 8,871,673 | B2 | 10/2014 | Schwefer et al. | |
| 9,637,436 | B2 | 5/2017 | Micoine et al. | |

(Continued)

FOREIGN PATENT DOCUMENTS

CN 103157466 A 6/2013
DE 10001539 B4 8/2001

(Continued)

OTHER PUBLICATIONS

International Preliminary Report on Patentability for PCT/EP2015/077524 dated Jun. 6, 2017.

(Continued)

*Primary Examiner* — Timothy C Vanoy
(74) *Attorney, Agent, or Firm* — Faegre Drinker Biddle & Reath LLP

(57) ABSTRACT

The present invention relates to a catalyst for decomposition of nitrous oxide and also to its method of preparation and use.

11 Claims, No Drawings

(56) References Cited

U.S. PATENT DOCUMENTS

| | | | |
|---|---|---|---|
| 10,286,381 B2* | 5/2019 | Deuerlein | B01J 21/066 |
| 2003/0143141 A1 | 7/2003 | Schwefer et al. | |
| 2004/0109805 A1 | 6/2004 | Schwefer et al. | |
| 2010/0234215 A1 | 9/2010 | Slaten et al. | |
| 2010/0300061 A1* | 12/2010 | Sobolevskiy | B01D 53/8628 60/39.5 |
| 2016/0228853 A1 | 8/2016 | Matsumura et al. | |
| 2018/0021757 A1 | 1/2018 | Karpov et al. | |

FOREIGN PATENT DOCUMENTS

| | | |
|---|---|---|
| DE | 102008048159 A1 | 4/2010 |
| DE | 102009023877 A1 | 12/2010 |
| DE | 102011111307 A1 | 2/2013 |
| EP | 0716883 A2 | 6/1996 |
| EP | 1503855 A1 | 2/2005 |
| EP | 1257347 B1 | 11/2005 |
| EP | 1370342 B1 | 11/2005 |
| EP | 1269040 B1 | 5/2006 |
| EP | 1372827 B1 | 5/2006 |
| EP | 1497014 B1 | 6/2006 |
| JP | H05103953 A | 4/1993 |
| JP | 2007152263 A | 6/2007 |
| JP | 2010242614 A | 10/2010 |
| WO | WO-03092887 A1 | 11/2003 |
| WO | WO-2009021586 A1 | 2/2009 |
| WO | WO-2012052835 A1 | 4/2012 |

OTHER PUBLICATIONS

Christoforou, S., et al., Catalytic Conversion of N2O to N2 over Metal-Based Catalysts in the Presence of Hydrocarbons and Oxygen, Catalysis Letters, 2002, vol. 79, No. 1-4, pp. 137-147.

Perbandt, C., et al., "Kinetics and Reactor Design for N2O Decomposition in the EnviNOx® Process", Chemie Ingenieur Technik, 2013, vol. 85, Issue 5, May, pp. 705-709.

International Search Report for PCT/EP2015/077524 dated Feb. 5, 2016.

* cited by examiner

CATALYST FOR DECOMPOSITION OF NITROUS OXIDE

CROSS-REFERENCE TO RELATED APPLICATIONS

This application is a continuation application of U.S. application Ser. No. 15/535,270 filed Jun. 12, 2017 which is incorporated by reference in its entirety. U.S. application Ser. No. 15/535,270 is a national stage application (under 35 U.S.C. § 371) of PCT/EP2015/077524, filed Nov. 24, 2015, which claims benefit of European Application No. 14196025.2, filed Dec. 3, 2014, both of which are incorporated herein by reference in their entirety.

The present invention relates to a catalyst for decomposition of nitrous oxide and also to its method of preparation and use.

Nitrous oxide ($N_2O$) is a greenhouse gas having a molecular global warming potential approximately 310 times that of carbon dioxide. The largest proportion of anthropogenic nitrous oxide originates in agriculture, but comparatively large amounts of $N_2O$ are also released in chemical manufacture including the production of nitric acid and adipic acid. Various catalytic methods are known for reducing nitrous oxide emissions from chemical manufacturing processes. Selective catalytic reduction of nitrous oxide by means of a reducing agent is one way and direct catalytic decomposition into oxygen and nitrogen is another. The use of a reducing agent means that the catalysts used are sufficiently active even at relatively low temperatures. Appropriate methods and systems are commercially available (DE 10001539 B4, EP 1269040 B1, EP 1257347 B1, EP 1370342 B1, EP 1372827 B1, EP 1497014 B1, U.S. Pat. No. 7,462,340 B2, U.S. Pat. No. 7,744,839 B2, WO 2009/021586 A1, Perbandt et al., Chem. Ing. Techn. 2013, vol. 85, No. 5, pages 705 to 709). Direct catalytic decomposition of nitrous oxide has the advantage of not incurring costs due to reducing agents nor emissions due to unspent reducing agent or secondary reactions of the reducing agent. However, known catalysts for use in the exhaust gas stream of a nitric acid plant, for example, are not sufficiently active at temperatures below 400° C. absent a reducing agent.

JP 05-103953 describes a method of simultaneously depleting nitrous gases (NO, $NO_2=NO_x$) and $N_2O$ in an exhaust gas stream admixed with hydrocarbons and then passed over a catalyst. The catalyst consists of one or more of the elements Cu, Ag, Cr, Fe, Co, Ni, Ru, Rh and Ir on various metal oxides acting as carriers.

JP 2010242614 describes a method to remove nitrous oxide from the exhaust gas stream of an internal combustion engine wherein the exhaust gas, which comprises 1 to 10 equivalents of CO (in relation to $N_2O$), is passed over a catalyst. The catalyst comprises noble metals (Pt with Pd or Rh) on a metal oxide carrier ($Al_2O_3$, $TiO_2$ or $CeO_2$) which may comprise zirconium dioxide or silicon dioxide as a further component.

JP 2007152263 discloses a DeNOx catalyst which in addition to an alkali metal and an alkaline earth or rare earth metal comprises one of the following elements: Ni, Cu, Co, Fe, Ag, Ru, Rh, Pt, Au, Pd or Ir. The carrier consists of a porous metal oxide having a pore volume of 0.1 to 0.6 ml/g. Metal oxides are titanium dioxide, aluminum oxide, silicon dioxide or zirconium dioxide, Rh on various metal oxides is known in the literature as a catalyst for nitrous oxide decomposition. However, most of the systems investigated are not sufficiently active under the conditions prevailing in an exhaust gas stream from an industrial facility (presence of small amounts of water and oxygen).

Christoforou et al. (Catalysis Letters 2002, vol. 79, pages 137 to 147) describe catalysts for nitrous oxide decomposition wherein various metals have been impregnated onto oxidic carriers. Ru and Rh catalysts on an aluminum oxide carrier displayed the best conversions. Catalysts comprising Rh on the other carriers, such as $SiO_2$ or $ZrO_2$, displayed lower conversions.

DE 10 2011 111 307 describes catalysts for decomposition of $N_2O$ in oxygen-containing gases. The catalysts comprise Rh metal on an oxide or mixed oxide having oxygen-storing properties (e.g., $CeO_2$ or $CeO_2$—$ZrO_2$). These catalysts do display activity at 180 to 300° C., but only at very low $N_2O$ concentrations in the exhaust gas (<1 ppm).

DE 10 2009 023 877 discloses supported catalysts comprising an active metallic component on a porous carrier material and also the use thereof for treatment of motor fuel exhaust gases.

EP 1 503 855 discloses catalysts comprising carriers based on zirconium dioxide and their use for dehydrogenations. The carrier is prepared via a specific method wherein a silicon compound is used as binder. The catalysts comprise one or more elements from transition group VIII or VI with or without further elements. These catalysts when used for dehydrogenations display better properties than catalysts of comparable composition which do not comprise a carrier prepared by this specific method.

It is an object of the present invention to provide a catalyst for decomposition of nitrous oxide in exhaust gas streams without added reducing agents at distinctly lower temperatures than permitted by prior art catalysts (preferably below 400° C.), while the exhaust gas streams should also be able to comprise oxygen and/or small amounts of water.

We have found that this object is achieved by a nitrous oxide decomposition catalyst comprising rhodium (Rh) on a specific carrier comprising $SiO_2$ and $ZrO_2$.

The invention accordingly provides a nitrous oxide decomposition catalyst comprising rhodium on a catalyst carrier, wherein the catalyst carrier is obtained by mixing zirconium dioxide powder with a silicon compound as binder, optionally a porogen, optionally an acid, water and optionally also further additives to form a kneadable composition, homogenizing the composition, shaping the composition into shaped articles, drying and calcination, wherein the binder is selected from silicon compounds of general formulae (I) to (VI)

$$(\text{Hal})_x\text{SiR}_{4-x} \tag{I}$$

$$(\text{Hal})_x\text{Si}(\text{OR}^1)_{4-x} \tag{II}$$

$$(\text{Hal})_x\text{Si}(\text{NR}^1\text{R}^2)_{4-x} \tag{III}$$

$$\text{R}_x\text{Si}(\text{OR}^1)_{4-x} \tag{IV}$$

$$\text{R}_x\text{Si}(\text{NR}^1\text{R}^2)_{4-x} \tag{V}$$

$$(\text{R}^1\text{O})_x\text{Si}(\text{NR}^1\text{R}^2)_{4-x} \tag{VI}$$

where

Hal in each occurrence is independently halogen (F, Cl, Br or I),

R in each occurrence is independently H or a substituted or unsubstituted alkyl, alkenyl, alkynyl, cycloalkyl, cycloalkenyl, arylalkyl or aryl radical, $R^1$ and $R^2$ in each occurrence are each independently H or a substituted or unsubstituted alkyl, acyl, arylalkyl or aryl radical, and x is from 0 to 4.

A preferred embodiment of the invention uses a zirconium dioxide powder having a particle size in the range from 0.2 to 50 μm for preparing the catalyst carrier. A further preferred embodiment of the invention uses a zirconium dioxide powder having a high specific BET surface area, typically in the range from 10 to 400 m²/g, more preferably in the range from 50 to 150 m²/g, for preparing the catalyst carrier.

A further preferred embodiment of the invention uses essentially monoclinic zirconium dioxide powder for preparing the catalyst carrier. Essentially monoclinic zirconium dioxide powder, which is from 85 to 100 wt % and preferably from 90 to 100 wt % monoclinic zirconium dioxide, is obtainable as described in EPA-A 0 716 883 by precipitation of zirconium salts with ammonia by adding a zirconium nitrate or zirconium chloride solution to an aqueous ammonia solution, the pH decreasing from 14 to 6, and having the precipitation product washed off, dried and calcined. The first step for this is to use zirconium carbonate and hydrochloric acid to prepare a very concentrated, generally from 2 to 5 mol % zirconium chloride solution or preferably zirconium carbonate and nitric acid to prepare a very concentrated, generally from 2 to 5 mol % zirconium nitrate solution. This solution is admixed, generally at temperatures of 20 to 60° C., under pH control, to an initially charged aqueous ammonia solution (about 15 mol % of $NH_3$), subject to the proviso that the admixing step is ended at a pH of 6 to 8 and the pH must not drop to below 6. This is followed by a subsequent stirring period of generally 30 to 600 min.

The precipitation product is, for example, washed off on a filter press to substantially free it from ammonium salts, dried and air calcined at a temperature of 300 to 600° C., preferably from 400 to 500° C. and a pressure of 0.05 to 1 bar.

The essentially monoclinic zirconium dioxide thus obtained will occasionally further comprise small amounts of the tetragonal or cubic polymorph. The proportion of the tetragonal or cubic polymorph can be reduced to below the limit of x-ray detection by preceding the calcination with a drying step at a water vapor partial pressure of 0.2 to 0.9 bar. The drying step takes about 16 hours at 120° C. for example.

The carriers of the catalysts according to the present invention are prepared by using silicon compounds as binders. Suitable binders include, for example, monomeric, oligomeric or polymeric silanes, alkoxysilanes, aryloxysilanes, acyloxysilanes, oximinosilanes, halosilanes, aminoxysilanes, aminosilanes, amidosilanes, silazanes or silicones, as described for example in Ullmann's Encyclopedia of Industrial Chemistry, vol. A24, on pages 21 to 56. They include more particularly the monomeric silicon compounds of general formulae (I) to (VI) hereinbelow:

$$(Hal)_x SiR_{4-x} \quad (I)$$

$$(Hal)_x Si(OR^1)_{4-x} \quad (II)$$

$$(Hal)_x Si(NR^1 R^2)_{4-x} \quad (III)$$

$$R_x Si(OR^1)_{4-x} \quad (IV)$$

$$R_x Si(NR^1 R^2)_{4-x} \quad (V)$$

$$(R^1 O)_x Si(NR^1 R^2)_{4-x} \quad (VI)$$

where

Hal in each occurrence is independently halogen (F, Cl, Br or I),

R in each occurrence is independently H or a substituted or unsubstituted alkyl, alkenyl, alkynyl, cycloalkyl, cycloalkenyl, arylalkyl or aryl radical, $R^1$ and $R^2$ in each occurrence are each independently H or a substituted or unsubstituted alkyl, acyl, arylalkyl or aryl radical, and x is from 0 to 4.

R, $R^1$ and $R^2$ may each be H, an alkyl radical, preferably a $C_1$-$C_6$ alkyl radical, which may be linear or branched. An alkyl radical R is especially methyl, ethyl, n-propyl, iso-propyl, n-butyl, sec-butyl or tert-butyl, specifically methyl or ethyl. R, $R^1$ and $R^2$ may each further be an aryl radical, preferably phenyl, or an arylalkyl radical, preferably benzyl.

R may further also be an alkenyl radical, preferably a $C_2$-$C_6$ alkenyl radical, especially vinyl or allyl, or an alkynyl radical, preferably ethynyl.

$R^1$ and $R^2$ may each further also be an acyl radical, preferably a $C_2$-$C_6$ acyl radical, especially an acetyl radical.

Examples of suitable silicon compounds of general formula (I) are for instance $SiCl_4$, $MeSiCl_3$, $Me_2SiCl_2$ and $Me_3SiCl$.

Suitable silicon compounds of general formula (IV) are for instance $Si(OEt)_4$, $MeSi(OEt)_3$, $Me_2Si(OEt)_2$ and $Me_3SiOEt$.

Suitable compounds of general formula (V) are for instance $Me_3Si(NMeCOMe)$ and $Me_3Si(NMeCOCH_2C_6H_5)$.

$(MeO)_3SiNMe_2$ is an example of a suitable compound of general formula (VI).

Examples of suitable oligomeric and polymeric organosilicon compounds are methylsilicones and ethylsilicones.

Very particularly preferred silicon-containing binders are methylsilicones, for example the Silres® products from Wacker.

The silicon compounds used as binders are generally liquid at room temperature. As a result, the high surface area zirconium dioxide becomes uniformly wetted with the silicon compound in the mixing step, as a result of which the silicon compound will envelop and partially saturate the zirconium dioxide particles. This results in considerable strengthening of the bind between the zirconium dioxide particles and in very good mechanical stability for the shaped catalyst carrier articles obtained. As the shaped catalyst carrier articles undergo calcination, the organic moieties of the silicon-containing binder are among the entities to burn off to form silicon dioxide ($SiO_2$), present in the zirconium dioxide matrix in a very fine state of subdivision. The combustion of the organic moieties of the silicon-containing binder leads to the formation of additional pores. Because the binder forms a uniform distribution in the zirconium dioxide matrix, the distribution of these additional pores is likewise very uniform. The overall porosity of the catalyst carrier increases as a result. The presence of $SiO_2$, moreover, stabilizes the zirconium dioxide against thermal sintering. The strength of this stabilizing effect increases with the uniformity of the silicon dioxide distribution.

The carrier materials of the catalysts according to the present invention comprise $SiO_2$ at generally from about 1 to 20 wt % and preferably at from about 3 to 10 wt %.

The method of preparing the catalysts of the present invention comprises a first step of mixing zirconium dioxide powder with the silicon-containing binder, optionally a porogen, optionally an acid, water and optionally also further additives to form a kneadable composition. Preferably a) 50 to 98 wt % of zirconium dioxide powder, b) 2 to 50 wt %, more preferably 5 to 20 wt %, of the silicon compound as binder, c) 0 to 48 wt %, more preferably 0 to 10 wt %, of porogen, and d) 0 to 48 wt %, more preferably 0 to 10 wt %, of further additives, wherein the sum total of components a) to d) adds up to 100 wt %.

Water is typically added to the mixture of zirconium dioxide powder and silicon compound in order to obtain a kneadable composition. An acid may further also be added to the mixture. Peptization of the kneadable composition is caused by this acid. Suitable acids include, for example, nitric acid and acetic acid; nitric acid is preferable.

A preferred embodiment of the invention uses a porogen to prepare the catalyst carrier. Suitable porogens include, for example, polyalkylene oxides such as polyethylene oxide, carbohydrates such as cellulose and sugar, natural fibers, pulp or synthetic polymers such as polyvinyl alcohol.

A further preferred embodiment of the invention uses further additives to prepare the catalyst carrier. Further additives include, for example, familiar rheology-influencing compounds such as hydroxymethylcellulose or polyalkylene oxides.

To prepare the carriers for the catalysts of the present invention, the components referred to are mixed homogeneous in customary mixing apparatus. Suitable mixing apparatus includes, for example, kneaders, mullers, Mix-Mullers, which ensure good commixing and homogenization of the initially inhomogeneous kneadable composition. The catalyst carrier molding composition is subsequently molded into shaped articles, as, for example, extruded into strands or hollow carriers.

The shaped catalyst carrier articles are then typically dried. Drying is carried out, for example, at a temperature of 90 to 120° C. for a period of 10 to 100 hours. The dried shaped catalyst carrier articles are subsequently calcined. Calcination is typically carried out at a temperature of 300 to 800° C., preferably 400 to 600° C., for a period of 0.5 to 6 hours. Calcination is preferably carried out in air and at atmospheric pressure.

The catalysts of the present invention comprise rhodium on the catalyst carrier, preferably in an amount of 0.01 to 1.00 wt % based on the final catalyst. The invention has a further embodiment wherein the catalyst on the catalyst carrier in addition to rhodium comprises yet further elements from transition group III including the lanthanides and/or from transition groups VI and/or VIII of the periodic table. In a preferred embodiment of the invention, the catalyst in addition to rhodium further comprises iron, chromium and/or molybdenum, more preferably molybdenum, on the catalyst carrier. In a particularly preferred embodiment of the invention, the catalyst comprises from 0.01 to 1.00 wt % of rhodium and from 0.01 to 0.50 wt % of molybdenum on the catalyst carrier.

The rhodium and the optionally present further elements are generally applied by impregnation with aqueous solutions of suitable compounds of the metals in question. Suitable compounds dissolve in water and are convertible into the corresponding metal oxide by calcination. The metal compound(s) may also be applied by spraying. Suitable metal salts include, for example, the nitrates, acetates and chlorides of the metals, but complex anions of the metals are also possible. Preference is given to using rhodium nitrate or rhodium acetate to apply rhodium and $Cr(NO_3)_3$ or $(NH_4)_2CrO_4$ to apply chromium.

The catalyst carriers impregnated with the metal salt solutions in question are typically calcined at a temperature of 350 to 650° C. for a period of 0.5 to 6 hours.

The present invention further provides a method of preparing the above-described nitrous oxide decomposition catalysts, which comprises a catalyst carrier obtained by mixing zirconium dioxide powder with a silicon compound as binder, optionally a porogen, optionally an acid, water and optionally also further additives to form a kneadable composition, homogenizing the composition, shaping the composition into shaped articles, drying and calcination, wherein the binder is selected from silicon compounds of general formulae (I) to (VI)

$$(\text{Hal})_x\text{SiR}_{4-x} \qquad (\text{I})$$

$$(\text{Hal})_x\text{Si}(\text{OR}^1)_{4-x} \qquad (\text{II})$$

$$(\text{Hal})_x\text{Si}(\text{NR}^1\text{R}^2)_{4-x} \qquad (\text{III})$$

$$\text{R}_x\text{Si}(\text{OR}^1)_{4-x} \qquad (\text{IV})$$

$$\text{R}_x\text{Si}(\text{NR}^1\text{R}^2)_{4-x} \qquad (\text{V})$$

$$(\text{R}^1\text{O})_x\text{Si}(\text{NR}^1\text{R}^2)_{4-x} \qquad (\text{VI})$$

where

Hal in each occurrence is independently halogen (F, Cl, Br or I),

R in each occurrence is independently H or a substituted or unsubstituted alkyl, alkenyl, alkynyl, cycloalkyl, cycloalkenyl, arylalkyl or aryl radical, $R^1$ and $R^2$ in each occurrence are each independently H or a substituted or unsubstituted alkyl, acyl, arylalkyl or aryl radical, and x is from 0 to 4, being impregnated with a rhodium-containing solution, then dried and calcined.

The present invention further provides the method of using the above-described catalysts for decomposition of nitrous oxide. In this method, the catalyst is preferably used at an operating temperature in the range from 250 to 700° C., preferably in the range from 300 to 430° C. and more preferably in the range from 350 to 425° C. The gas stream passed over the catalyst preferably comprises up to 20 000 ppm of $N_2O$, and more preferably comprises up to 5000 ppm of $N_2O$, and may further comprise up to 2000 ppm of $NO_x$, up to 1% of $H_2O$ and/or up to 5% of $O_2$.

A further preferred embodiment of the invention is the method of using the above-described catalysts for decomposition of nitrous oxide in the production of nitric acid or caprolactam.

The examples which follow illustrate the invention.

EXAMPLES

Example 1

Preparation of Catalyst Carrier 3680 g of $ZrO_2$ powder are heated at 450° C. for 3 hours and then muller mixed with 262.6 g of methoxysilane (Silres MSE 100 from Wacker), 110.4 g of polyethylene oxide (Alkox E100), 110.4 g of 65 wt % $HNO_3$ and 1270 g of water for 20 minutes. The resulting doughy composition was screw extruded into strands of 3 mm outside diameter, and the strands were dried at 120° C. and then heated at 560° C. for 4 hours. The carrier obtained had a BET surface area of 95 m²/g and a porosity of 0.36 ml/g (measured using mercury porosimetry) and had a bimodal pore diameter distribution with maxima at 20 and 450 nm. The carrier had a cutting resistance of 35 N.

Example 2

Preparation of Catalyst ($Rh/ZrO_2/SiO_2$)

3.37 g of aqueous rhodium nitrate solution (13.7 wt %, from Haereus, corresponds to 0.461 g of Rh) were made up with water to 101 ml. 230 g of carrier material (1.5 mm strands from Example 1) were initially charged to a flask, the impregnating solution was added followed by allowing to stand for 30 min with shaking every 5 min. Thereafter the supernatant solution was removed in a rotary evaporator. This was followed by vacuum drying at 125° C. for 16 hours, then calcination at 540° C./4 h/100 I(S.T.P.)/h $N_2$ in a rotary tube furnace and a subsequent passivation with air. The strands comprised 0.20 wt % of Rh.

Examples 3 and 4

Preparation similar to Example 2 using respectively 8.65 and 11.13 g of rhodium nitrate solution (34 wt %, BASF Italia). The strands comprised respectively 0.32 and 0.42 wt % of Rh.

Example 5

Preparation of Catalyst ($Mo/Rh/ZrO_2/SiO_2$)

3.37 g of rhodium nitrate solution (13.7 wt %, from Haereus, corresponds to 0.461 g of Rh) and 4.61 ml of Mo-ICP solution (from ABCR 1 g of Mo in 5% $HNO_3$, corresponds to 0.0461 g of Mo) were mixed and made up with water to 101 ml. 230 g of carrier material (1.5 mm strands from Example 1) were initially charged to a flask, the impregnating solution was added followed by allowing to stand for 30 min with shaking every 5 min. Thereafter, supernatant water was removed in a water jet pump vacuum (20 mbar) at a water bath temperature of 85° C. This was followed by vacuum drying at 125° C. for 16 hours, then calcination at 540° C./4 h/100 I(S.T.P.)/h $N_2$ in a rotary tube furnace and a subsequent passivation with air. The strands had an Rh content of 0.20 wt % and an Mo content of 0.02 wt %.

Example 6

Preparation similar to Example 5 using 0.231 g of Mo (0.39 g $H_2MoO4$ in 10 ml of 2M $HNO_3$) and 3.37 g of rhodium nitrate solution (13.7 wt %, from Haereus, corresponds to 0.461 g of Rh) made up to 101 ml with water. The strands had an Rh content of 0.20 wt % and an Mo content of 0.10 wt %.

Comparative Examples 1-5

110 g of carrier material were impregnated with 47 ml of precursor solution. The rest of the procedure was similar to Example 2. The precursors used were: $IrCl_3 \times H_2O$ (dissolved with 9 ml of HCl), $Pd(NO_3)_2$, $RuCl_3 \times H_2O$, $Fe(NO_3)_{3x}$ $9H_2O$, Pt-A solution (an amine-diluted aqueous platinum hydroxide ($H_2Pt(OH)_6$) solution.

Comparative Examples 6-11

Example 2 was repeated to prepare the catalysts except that the carrier of Example 1 was replaced by the following carriers: tetragonal $ZrO_2$ with 4.2 wt % of Si (Saint-Gobain NorPro SZ 61152, monoclinic $ZrO_2$ with 5.0 wt % of Si (Saint-Gobain Norpro SZ31107), pure predominantly monoclinic $ZrO_2$, $SiO_2$, $\gamma$-$Al_2O_3$ and $CeO_2$.

Nitrous Oxide Decomposition:

23 g (20 ml) of catalyst were packed into a vertically upright 230 ml tubular reactor having an inside diameter of 25 mm together with a 3 mm inside tube for the thermocouple. The packing of the catalyst was in the center of the tube between 1 to 1.5 mm layers of quartz glass chips. The tubular reactor was heated using an electric oven and the temperature in the catalyst bed was measured in the center of the catalyst bed by means of a thermocouple. A gas mixture consisting of 3% $O_2$, 1000 ppm $N_2O$, 3000 ppm $H_2O$, 96.6% $N_2$ was passed over the catalyst at a pressure of 8 bar and a GHSV of 20 000 h$^{-1}$, and the reaction gases were analyzed using infrared spectroscopy.

Table 1 comprises the results for invention catalysts as per Examples 2 to 6 (B2 to B6) and for Comparative Examples 1 to 11 (VB1 to VB11).

TABLE 1

| X = $N_2$O conversion | | | | |
|---|---|---|---|---|
| B2: 0.20% Rh | | | | |
| T [° C.] | 289 | 309 | 325 | 361 |
| X [%] | 0 | 1.9 | 5.8 | 25 |
| B3: 0.32% Rh | | | | |
| T [° C.] | 289 | 309 | 327 | 361 |
| X [%] | 2.4 | 9.1 | 26 | 71.2 |
| B4: 0.42% Rh | | | | |
| T [° C.] | 287 | 308 | 325 | 361 |
| X [%] | 2.9 | 13.6 | 33 | 73.8 |
| B5: 0.20% Rh 0.02% Mo | | | | |
| T [° C.] | 289 | 308 | 326 | 360 |
| X [%] | 0 | 2.9 | 11.5 | 37.5 |
| B6: 0.20% Rh 0.10% Mo | | | | |
| T [° C.] | 288 | 306 | 324 | 359 |
| X [%] | 0 | 3 | 9.1 | 32.2 |
| VB1: 0.38% Ir | | | | |
| T [° C.] | 285 | 307 | 325 | 359 |
| X [%] | 0 | 1 | 1.9 | 6.7 |
| VB2: 0.40% Pd | | | | |
| T [° C.] | 284 | 305 | 322 | 356 |
| X [%] | 0 | 0 | 3 | 8 |
| VB3: 0.47% Ru | | | | |
| T [° C.] | 256 | 283 | 299 | 329 |
| X [%] | 0 | 0 | 2 | 5 |
| VB4: 0.49% Fe | | | | |
| T [° C.] | 287 | 307 | 325 | 359 |
| X [%] | 0 | 0 | 0 | 0 |
| VB5: 0.45% Pt | | | | |
| T [° C.] | 283 | 305 | 324 | 357 |
| X [%] | 0 | 0 | 0 | 1.6 |

TABLE 1-continued

X = N₂O conversion

VB6: 0.33% Rh ZrO₂—SiO₂

| T [° C.] | 292 | 316 | 335 | 371 |
|---|---|---|---|---|
| X [%] | 1 | 4 | 10 | 36.5 |

VB7: 0.34% Rh ZrO₂—SiO₂ tetragonal

| T [° C.] | 278 | 304 | 321 | 357 |
|---|---|---|---|---|
| X [%] | 0 | 1 | 4.8 | 8.7 |

VB8: 0.33% Rh ZrO₂ monoclinic

| T [° C.] | 266 | 293 | 320 | 350 |
|---|---|---|---|---|
| X [%] | 0 | 0 | 1.1 | 5.9 |

VB9: 0.33% Rh SiO₂

| T [° C.] | 266 | 292 | 319 | 349 |
|---|---|---|---|---|
| X [%] | 0 | 1 | 2.8 | 9.6 |

VB10: 0.33% Rh Al₂O₃

| T [° C.] | 294 | 315 | 333 | 368 |
|---|---|---|---|---|
| X [%] | 0 | 1.1 | 4.1 | 12 |

VB11: 0.33% Rh CeO₂

| T [° C.] | 269 | 296 | 323 | 350 |
|---|---|---|---|---|
| X [%] | 0 | 3.6 | 16.6 | 46.8 |

Rh on ZrO₂/SiO₂ carrier obtained according to the present invention gave a higher conversion than other metals on this carrier. Rh on ZrO₂/SiO₂ carrier obtained according to the present invention gave a higher conversion than Rh on other carriers.

The nitrous oxide decomposition runs were repeated with 1000 ppm NO in the gas mixture.

| | metal content [%] | | | | | | | | | |
|---|---|---|---|---|---|---|---|---|---|---|
| | 0.20 Rh | 0.32 Rh | 0.42 Rh | 0.38 Ir | 0.4 Pd | 0.47 Ru | 0.49 Fe | 0.45 Pt | 0.20 Rh 0.02 Mo | 0.20 Rh 0.10 Mo |
| temperature [° C.] | 361 | 361 | 360 | 359 | 356 | 331 | 359 | 359 | 357 | 358 |
| conversion [%] | 4.8 | 15.4 | 17.5 | 11.5 | 0 | 3.0 | 0 | 1.0 | 6.3 | 7.1 |

The decomposition of N₂O is appreciably impaired by the presence of NO$_x$ in the gas mixture. However, the catalysts of the present invention gave a distinctly higher conversion than catalysts comprising other metals.

The addition of a small amount of molybdenum also had a positive effect on catalyst performance with NO$_x$ in the gas mixture. The catalysts comprising 0.10 or 0.20 wt % of Mo gave a higher conversion, at the same temperature, than catalysts comprising Rh only.

Table showing catalyst analytics:

| Catalyst carrier | BET [m²/g] | Pore volume [cm³/g] | Si content |
|---|---|---|---|
| as per invention | 95 | 0.30 | 7.3% |
| SiO₂—ZrO₂ tetragonal Saint-Gobain NorPro SZ 61152 | 141 | 0.33 | 4.2% |
| SiO₂—ZrO₂ monoclinic Saint-Gobain NorPro SZ 31107 | 100 | 0.33 | 5.0% |
| Al₂O₃ | 216 | 0.69 | 0% |

We claim:

1. A nitrous oxide decomposition catalyst comprising rhodium on a catalyst carrier, wherein the catalyst carrier is obtained by mixing zirconium dioxide powder with a silicon compound as binder, optionally a porogen, optionally an acid, water and optionally also further additives to form a kneadable composition, homogenizing the composition, shaping the composition into shaped articles, drying and calcination, wherein the binder is selected from silicon compounds of general formulae (I) to (VI)

$$(Hal)_x SiR_{4-x} \quad (I)$$

$$(Hal)_x Si(OR^1)_{4-x} \quad (II)$$

$$(Hal)_x Si(NR^1R^2)_{4-x} \quad (III)$$

$$R_x Si(OR1)_{4-x} \quad (IV)$$

$$R_x Si(NR^1R^2)_{4-x} \quad (V)$$

$$(R^1O)_x Si(NR^1R^2)_{4-x} \quad (VI)$$

where
Hal in each occurrence is independently halogen,
R in each occurrence is independently H or a substituted or unsubstituted alkyl, alkenyl, alkynyl, cycloalkyl, cycloalkenyl, arylalkyl or aryl radical,
$R^1$ and $R^2$ in each occurrence are each independently H or a substituted or unsubstituted alkyl, acyl, arylalkyl or aryl radical, and
x is from 0 to 4 and
wherein the catalyst does not contain any Pd.

2. The catalyst according to claim 1 wherein the catalyst carrier is prepared by mixing
a) 50 to 98 wt % of zirconium dioxide powder,
b) 2 to 50 wt % of the silicon compound as binder,
c) 0 to 48 wt % of porogen, and
d) 0 to 48 wt % of further additives,
wherein the sum total of components a) to d) adds up to 100 wt %, in the presence of water and optionally of an acid to form a kneadable composition.

3. The catalyst according to claim 1 wherein the zirconium dioxide powder consists essentially of monoclinic zirconium dioxide.

4. The catalyst according to claim 1 wherein zirconium dioxide powder has a particle size in the range from 0.2 to 50 μm.

5. The catalyst according to claim 1 wherein zirconium dioxide powder has a specific BET surface area in the range from 10 to 400 m²/g.

6. The catalyst according to claim 1 wherein the catalyst on the catalyst carrier comprises yet further elements from transition group III including the lanthanides and/or from transition groups VI and/or VIII of the periodic table.

7. The catalyst according to claim 1 wherein the catalyst on the catalyst carrier further comprises molybdenum.

8. The catalyst according to claim 1, wherein the catalyst on the catalyst carrier further comprises 0.01 to 0.5% by weight molybdenum and said rhodium is in amount from 0.01 to 1.00% by weight of the amount of the catalyst.

9. A method of preparing nitrous oxide decomposition catalysts, which comprises a catalyst carrier obtained by mixing zirconium dioxide powder with a silicon compound as binder, optionally a porogen, optionally an acid, water and optionally also further additives to form a kneadable composition, homogenizing the composition, shaping the composition into shaped articles, drying and calcination, wherein the binder is selected from silicon compounds of general formulae (I) to (VI)

$(Hal)_xSiR_{4-x}$ (I)

$(Hal)_xSi(OR^1)_{4-x}$ (II)

$(Hal)_xSi(NR^1R^2)_{4-x}$ (III)

$R_xSi(OR^1)_{4-x}$ (IV)

$R_xSi(NR^1R^2)_{4-x}$ (V)

$(R^1O)_xSi(NR^1R^2)_{4-x}$ (VI)

where

Hal in each occurrence is independently halogen,

R in each occurrence is independently H or a substituted or unsubstituted alkyl, alkenyl, alkynyl, cycloalkyl, cycloalkenyl, arylalkyl or aryl radical, $R^1$ and $R^2$ in each occurrence are each independently H or a substituted or unsubstituted alkyl, acyl, arylalkyl or aryl radical, and x is from 0 to 4, being impregnated with a rhodium-containing solution, then dried and calcined and wherein the catalyst does not contain any Pd.

10. A method for decomposition of nitrous oxide which comprises decomposing nitrous oxide with the catalyst as claimed in claim 1 at a temperature range from 250 to 700° C.

11. The method according to claim 10 wherein the gas stream passed over the catalyst comprises up to 20 000 ppm of $N_2O$ with or without up to 2000 ppm of $NO_x$, up to 1% of $H_2O$ and/or up to 5% of $O_2$.

* * * * *